United States Patent [19]
Chandra et al.

[11] Patent Number: 5,978,936
[45] Date of Patent: Nov. 2, 1999

[54] RUN TIME ERROR PROBE IN A NETWORK COMPUTING ENVIRONMENT

[75] Inventors: Arun Chandra; Douglas Craig Bossen; Nandakumar Nityananda Tendolkar, all of Austin, Tex.

[73] Assignee: International Business Machines Corporation, Armonk, N.Y.

[21] Appl. No.: 08/974,574

[22] Filed: Nov. 19, 1997

[51] Int. Cl.$^6$ .................................................. G06F 12/14
[52] U.S. Cl. .............................. 714/43; 714/47; 714/25
[58] Field of Search ................................ 714/25, 30, 43, 714/47, 51, 37, 39, 715

[56] References Cited

U.S. PATENT DOCUMENTS

| | | | |
|---|---|---|---|
| 4,114,093 | 9/1978 | Long | 714/734 |
| 4,716,564 | 12/1987 | Hung et al. | 714/738 |
| 5,410,551 | 4/1995 | Edwards et al. | 714/736 |
| 5,563,875 | 10/1996 | Hefel et al. | 370/249 |
| 5,684,807 | 11/1997 | Bianchini, Jr. et al. | 714/712 |
| 5,828,824 | 10/1998 | Swoboda | 714/25 |
| 5,884,036 | 3/1999 | Haley | 709/224 |

OTHER PUBLICATIONS

D. P. Brahme and J. A. Abraham, "Functional Testing of Microprocessors", IEEE Trans. Comput. C–33, No. 6, Jun. 1984, pp. 475–485.

S. M. Thatte and J. A. Abraham, "Test Generation for Microprocessors", IEEE Trans. Comput. C–26, No. 6, Jun. 1980, pp. 429–441.

D. P. Siewiorek and R. Swarz, "Reliable Computer Systems Design and Evaluation", Second Edition, 1992, 130–137 and 246–248.

J. Fabre, Y. Deswarte, J. Laprie, and D. Powell, "Saturation: Reduced Idleness for Improved Fault–Tolerance", IEEE Proc. of 18th International Symposium on Fault–Tolerant Computing, Jun. 1988, Tokyo, Japan, 200–205.

*Primary Examiner*—Robert W. Beausoliel, Jr.
*Assistant Examiner*—Wasseem Hamdan
*Attorney, Agent, or Firm*—Anthony V.S. England

[57] ABSTRACT

A first set of test instructions are provided for a first node in a computer network. A corresponding second set is provided for a second node in the network. The test instruction sets are partitioned into modules. The nodes process their respective sets of test instructions independently to generate test results for each module on each node, except when a synchronizing event occurs. Each node stores its test results for each test module. Since the test modules have an ordered processing sequence, each node's test results for corresponding test modules can be compared asynchronously on an ongoing basis.

21 Claims, 4 Drawing Sheets

RUN TIME ERROR PROBE IN A NETWORK COMPUTING ENVIRONMENT

FIELD

This invention relates generally to the detection of malfunctions in a network computing environment and more specifically may apply to detection of such malfunctions using probes running asynchronously on a number of nodes.

CROSS REFERENCE TO RELATED PATENT APPLICATIONS

None.

BACKGROUND

In computer systems, hardware failures can cause erroneous processing results, such as database corruption, if the failure is undetected. In large computer system networks, the impact of undetected failures is especially severe, since for example, databases maintained on large networks can be very large and can be very difficult to reconstruct.

Hardware signature analysis has been used in processor development to detect failures. In signature analysis, a set of known inputs is dynamically applied to hardware being tested. The outputs of the hardware are then compacted into a signature by a predetermined hardware circuit such as a linear feedback shift register. The signature of the hardware under test can then be compared with a good signature to detect faults in the tested hardware. If the hardware under test is faulty, then the signature obtained will not match that of the known good signature.

It is also known to use such hardware signature analysis in a computer network at run time by running identical applications in a lock step manner on two nodes, and comparing the results. However, the constraint that the two nodes run the code in a synchronized fashion has an impact on normal processing in the two nodes. Therefore, a need exists, for improvements in hardware detection, particularly for large computer networks.

SUMMARY OF THE INVENTION

An objective of the invention is to detect hardware malfunctions in a network by running tests in a manner that does not interfere with, or degrade normal processing.

According to the present invention, the foregoing and other objects are attained by providing corresponding sets of test instructions for a number of nodes in a computer network. The test instructions are partitioned into test modules. The modules are processed by the nodes independently, unless a synchronizing event arises. When a node completes processing of one of its test modules, the node stores a test result corresponding to the test module. Meanwhile, another node processing its set of the test modules, stores test results for each one of the modules which it completes. Thus the two nodes process the test modules asynchronously. That is, each node may defer its own test module processing independently of the other nodes in response to a higher priority task for the respective node, whereas other nodes, which do not have at that time a higher priority task, may independently continue processing test modules during idle time.

In another aspect, a node compares its test results for its completed modules with test results from another one of the node's completed modules at selected occasions. The test modules have an ordered sequence. That is, there is a first module, a second module, a third module, and so on, in each set of modules on each one of the nodes. The nodes process the corresponding test modules in the same ordered sequence, so that comparisons can be made of a first node's tests results and a second node's test results on an on-going basis. That is, for example, when a third module is the highest order module that a first node has completed, the first node will have also, at that time, completed a first and second test module. Thus, upon completion of the third test module by the first node, the first node can obtain the status of test module processing from a second node. If the second node has completed only its first test module, for example, then the first node's first test module results may at that time be compared with the second node's first test module results.

In another aspect, in using a different example, if the first node has completed only its first test module, but the second node has completed its third test module, the first node, upon determining the status of the second node, may complete additional test modules in order to catch up with the second node. That is, the first node may complete its second and third test module so that both the first and second nodes have completed corresponding third test modules. Then the first and second nodes' results from the corresponding third test modules can be compared. This aspect of the invention, wherein one node synchronizes, i.e., catches up, with another node, can be performed as a high priority task, not subject to deferral by other processing tasks. This catching up can be initiated by an event which makes it advantageous for proper functioning of a node to be confirmed with increased certainty. For example, if node one is called upon to process a "database write" then it would be advantageous for avoiding database corruption to ensure, insofar as reasonably achievable, that node one is properly functioning before writing to the database. Therefore, node one could be forced to catch up with node two, processing the second and third test modules and comparing results with node two, before writing to the database, thereby increasing certainty that a malfunction in node one will be detected before writing to the database.

In another aspect of the invention, three nodes' respective results for a corresponding one of the test modules can be compared. That is, for example, a highest order test module which has been completed by all three of the nodes is compared. Thus, if two of the nodes' results agree, and the results of the third node does not agree with that of the first and second node, this indicates a likelihood that there has been a failure by the third node.

It is an advantage of the present invention that the method, product and/or apparatus permit test module processing during idle phases of nodes on the network, so that normal processing is not impaired.

It is another advantage that the invention can be applied widely, on heterogenous platforms, without special software or hardware.

Additional objects, advantages, and novel features are set forth in the following description, or will be apparent to those skilled in the art or those practicing the invention. Other embodiments are within the spirit and scope of the invention. These objects and embodiments may be achieved by the combinations pointed out in the appended claims. The invention is intended to be limited only as defined in the claims.

DETAILED DESCRIPTION

To clearly point out novel features of the present invention, the following discussion omits or only briefly describes conventional features of information processing systems which are apparent to those skilled in the art. It is assumed that those skilled in the art are familiar with signature analysis, on line testing, fault-tolerant computing, network computing, and a multiuser, multiprocessor operating system, and in particular with the requirements of such an operating system for memory management including virtual memory, processor scheduling, synchronization facilities for both processes and processors, message passing, ordinary device drivers, terminal and network support, system initialization, interrupt management, system call facilities, and administrative facilities.

Figure 1:
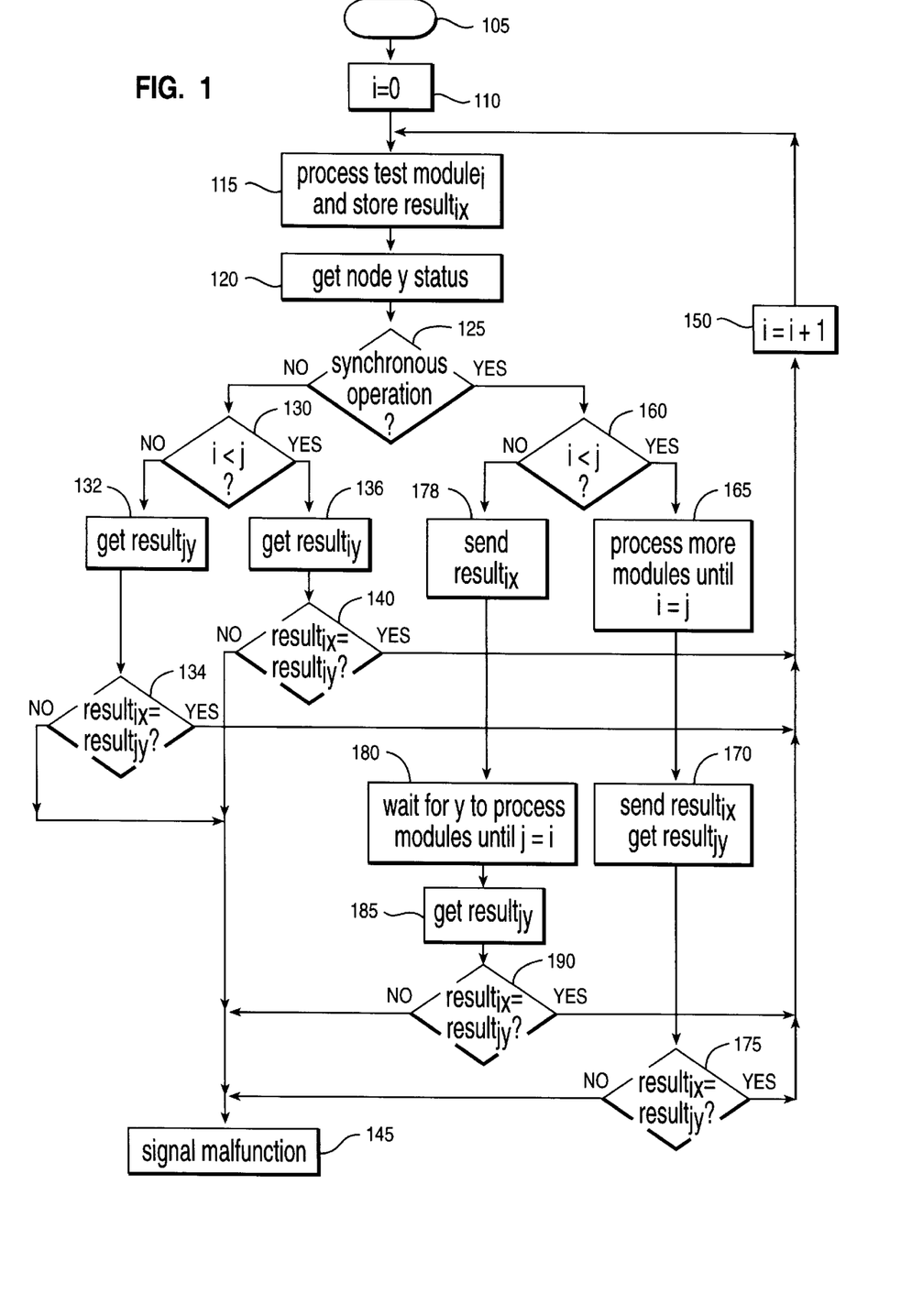
FIG. 1 is a flow chart for a run time probe which runs asynchronously on a pair of nodes, illustrating an embodiment of the present invention.

Referring now to FIG. 1, the flow chart is shown for the processing of test modules in a typical node on a computer network. It should be understood that certain aspects of test instructions are well known. See, for example, David P. Siewiorek and Robert Swarz, *Reliable Computer Systems Design and Evaluation*, Second Edition, 1992, 130–137, (discussing timers and checkpoints, among other things), and 246–248 (surveying test literature); D. Brahme and J. A. Abraham, "Functional Testing of Microprocessors", IEEE Trans. Comput. C-33, no. 6 (June, 1984), 475–485; and S. M. Thatte and J. A. Abraham, "Test Generation for Microprocessors", IEEE Trans. Comput. C-26 (June, 1980), 429–441, all of which are hereby incorporated herein by reference. It is expected that ongoing development in testing will yield test instructions which provide greater fault coverage.

It should also be understood, that there are tradeoffs in the choices among suitable test modules. Test modules written in a low level language, such as assembly language, assure high controllability and observability and make hardware failure detection more reliable, and make it easier to detect a wide range of hardware failure. However, test modules written in such a low level language are generally not portable, whereas test modules written in a high level language, such as C, are portable across a wide range of platforms, although they provide lower controllability, observability, etc.

Test programs for hardware detection by signature analysis are generally quite large, and their processing is therefore very intensive. This has generally favored the use of signature analysis on hardware in a development effort rather than as a run time tool. However, by partitioning signature analysis programs into test modules producing a signature for each of the modules, as provided in the present invention, and coordinating the processing of the test modules concurrently but in an asynchronous mode among a number of nodes, enables the use of signature analysis in a run time environment.

The processing of test modules in a node begins at 105. At 110, the initialization occurs in a first test module and the test module sequence is selected for processing. At 115, the first test module is processed. The processing of the test module may be as a low priority task, wherein the test module processing may be deferred in the node upon the occurrence of a higher priority task being presented to the node for processing. Then, once the node has completed its processing duty, at least for a time, idle processing cycles therefore become available, the node may return to processing the test module. Upon completion of processing the test module, the result for the module is stored at 115. In response to completion of the test module, at 120, the node, which is node $N_X$ in our example, which is referred to as node $N_X$ gets the status of test module processing from node $N_Y$. Node $N_Y$ is a node which has been configured to be paired up with node $N_X$ in the embodiment illustrated by the flow chart of FIG. 1.

Next, at 125, after obtaining the status of node $N_{Y's}$ test module processing, node $N_X$ determines whether there is a demand for synchronous operation. That is, whether it is required that node $N_X$ and node $N_Y$ bring themselves into synchronization with respect to their test module processing. A demand for synchronous operation may be called for such as due to a database write instruction, an I/O instruction, or a user-specified interrupt, to name a few examples.

If there is no demand for synchronous operation, then at 130, node $N_X$ determines whether node $N_Y$ has completed higher ordered test modules than has node $N_X$. That is, I, the order of test modules which node $N_X$ has completed is compared to J, the order of test modules which node $N_Y$ has completed. If I is less than J, this indicates that node $N_Y$ has completed higher ordered test modules than node $N_X$. Therefore, in this case, node $N_X$ gets the result from node $N_Y$ of node $N_{Y's}$ processing of test modules. The lowest order of test module which has been completed by both node $N_X$ and node $N_Y$, is retrieved at 136. On the other hand, if I is not less than J, this indicates that node $N_X$ has completed a test module of at least the same order of test modules completed by node $N_Y$. Thus, in this case, at 132, node $N_X$ gets the result from node $N_Y$ of node $N_Y$'s processing of the highest order test module processed by node $N_Y$. That is, result J from node $N_Y$. The corresponding results are then compared at 134 or 140, as applicable. If the results match, this tends to indicate that there is no hardware failure. That is, the signatures produced by the test modules, which are compared, do not indicate any hardware failure. In such a case, the flow of processing branches to 150. At 150, the next test module in the sequence is selected for processing by node $N_X$.

If synchronous operation is called for at 125, then I is compared to J at 160. If I is less than J, indicating that node N, has processed less test modules than node $N_Y$, then node $N_X$ processes more test modules at 165, until node $N_X$ has caught up in test module processing with node $N_Y$. Then, at 170, node $N_X$ sends to node $N_Y$ the test result from the highest order test module processed by node $N_X$, now that node $N_X$ has caught up with node $N_Y$. Also, at 170, node $N_X$ gets node $N_{Y'S}$ test result from node $N_Y$'s highest order completed test module. Then, at 175, the highest order results are compared. If the test results match, indicating that no hardware failure is detected, then node $N_X$ proceeds, at 150, to select the next test module for processing.

If the comparison at 160 of node $N_X$ and node $N_Y$ test module processing status indicates that node $N_X$ has processed at least as many test modules as node $N_Y$, then, at 178, node $N_X$ sends the result of the highest order test module processed by node $N_X$ to node $N_Y$. Then, at 180, node $N_X$ waits for node $N_Y$ to process additional test modules until node Ny catches up with node $N_X$. Once node $N_Y$ has processed a test module of the same order completed by node $N_X$, then at 185, node $N_X$ gets the result of that test module from node $N_Y$. Then, at 190, the results of the highest order test modules processed by both node $N_X$ and node $N_Y$ are compared. If the test results match, there is no indication of a failure, and therefore, at 150, node $N_X$ selects the next test module for processing and continues.

If any of the comparisons of corresponding test module results, at 134, 140, 175, or 190, indicate that there has been a failure, then at 145 a malfunction is signaled. This indication may be used to shut down both nodes and notify an administrator.

Figure 2A:
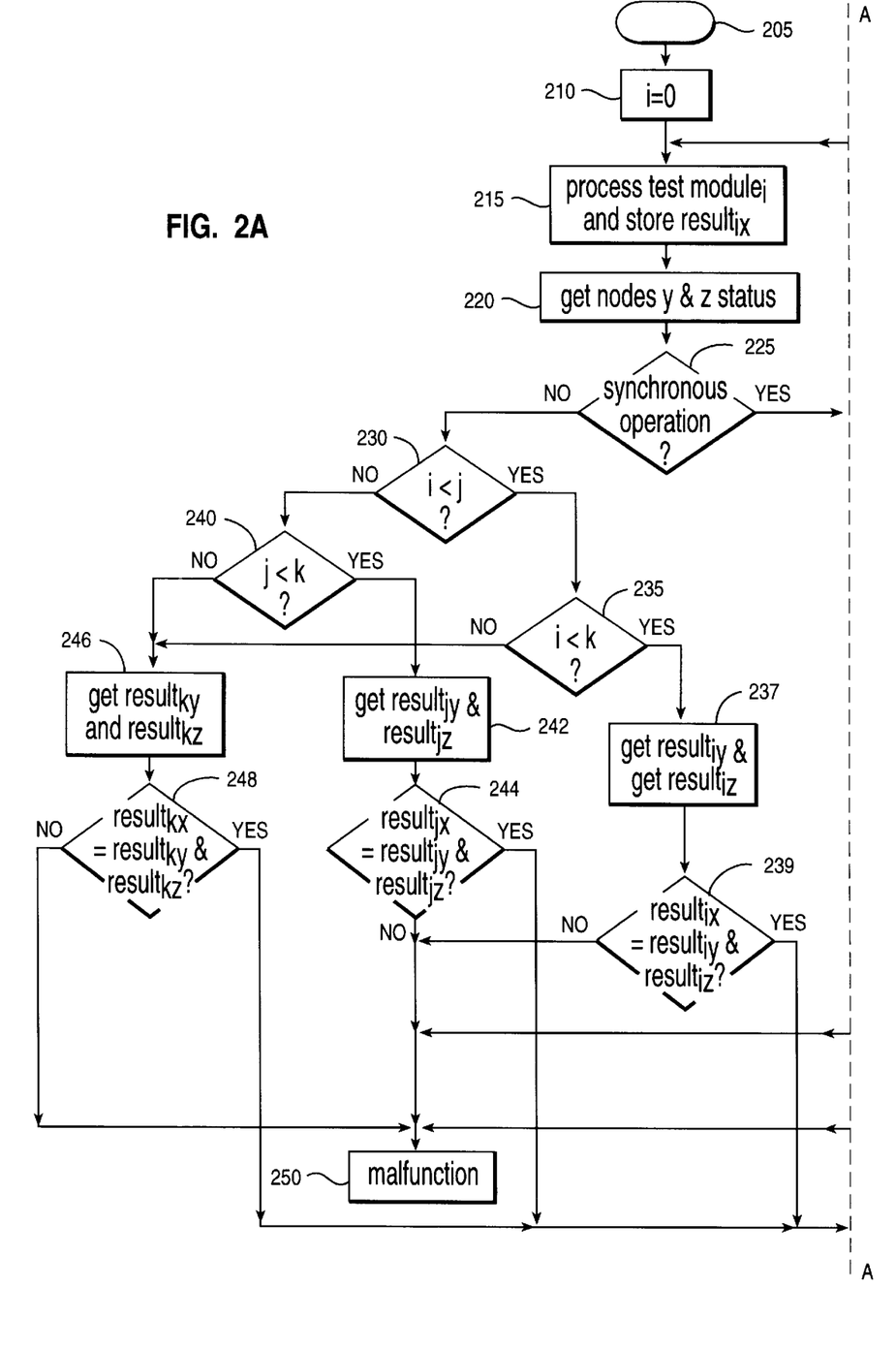
FIG. 2 is a flow chart for a run time probe which runs asynchronously on a triplet of nodes, illustrating another embodiment.
Figure 2B:
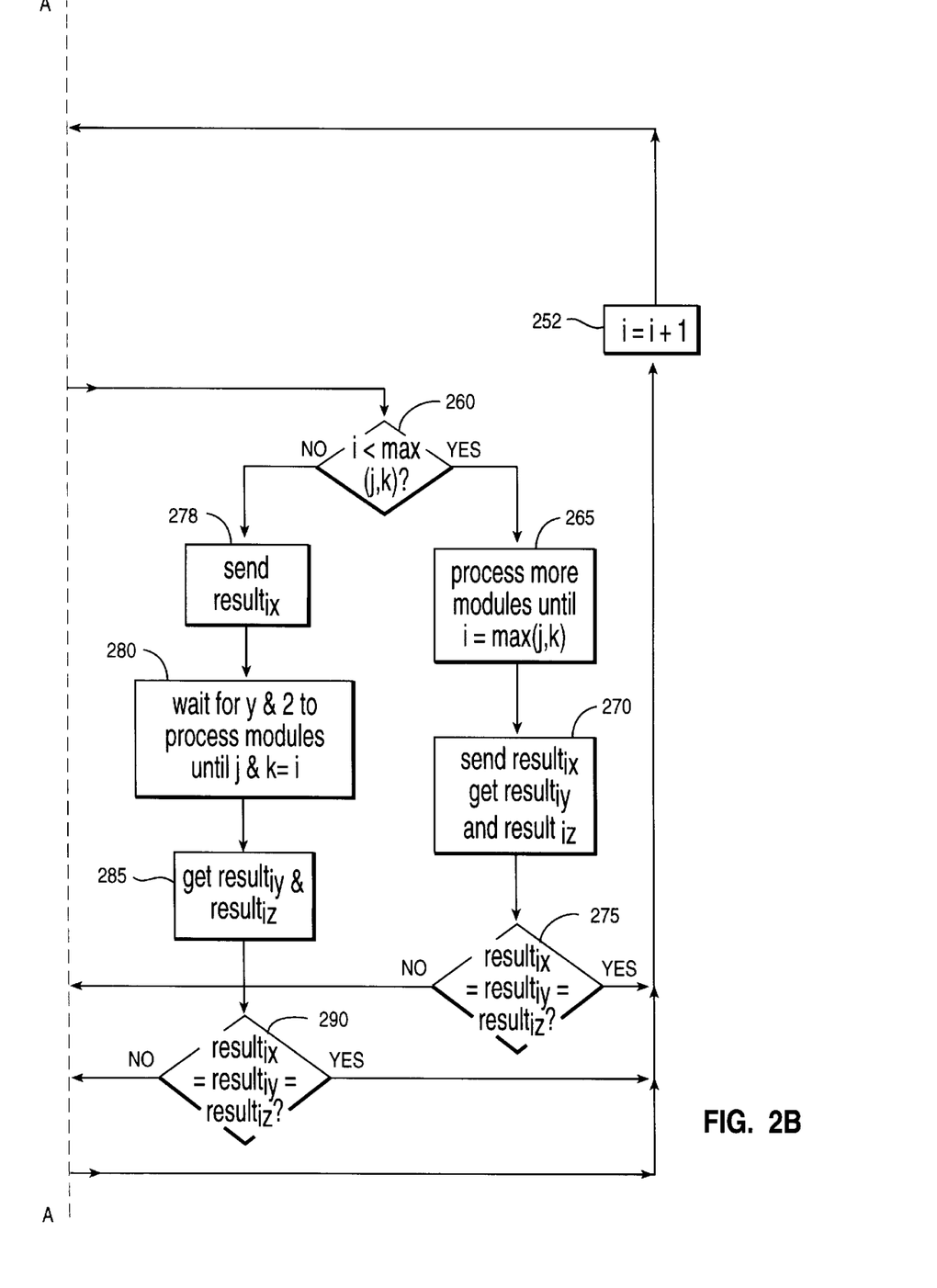

Referring now to FIG. 2, a flow chart is shown for test module processing by a node, wherein three nodes asynchronously process corresponding test module sets. In this case the three nodes are referred to as node $N_X$, $N_Y$, and $N_Z$, and the corresponding test module completion index is referred to as I for node $N_X$, J for node $N_Y$, and K for node $N_Z$. Test module processing initially begins at 205, leading to initialization at 210, wherein a first test module for processing by node $N_X$ is selected. At 215, the first module is processed and a result is stored upon completion. In this case, just as in the case illustrated in FIG. 1, test module processing may be deferred independently by any of the nodes in response to a higher priority task for the respective node. Once a test module processing is eventually completed, then for node $N_X$ the result is stored, as indicated at 215. Then at 220, node $N_X$ gets the status of test module processing for node $N_Y$ and node $N_Z$.

At 225, node $N_X$ determines whether synchronous operation is required. If not, at 230, 235, and 240, it is determined which node is the furthest behind in completing test modules. The result is then obtained from nodes $N_Y$ and $N_Z$, at 237, 242, or 246, as applicable, for the highest order test module which all nodes have completed. Then at 239, 244 or 248, as applicable, the results are compared for the corresponding highest order completed test module, and if all results match, then node $N_X$ selects the next test module for processing at 252.

If synchronous operation is indicated at 225, then, at 260, it is determined whether node $N_X$ is behind either node $N_Y$ or $N_Z$ in processing test modules. If node $N_X$ is behind either nodes $N_Y$ or $N_Z$, then, at 265, node $N_X$ processes more test modules to catch up. That is, node $N_X$ processes additional test modules until node $N_X$ has processed and completed a module of an order as high as the highest order module completed by node $N_Y$ or node $N_Z$. Then, at 270, node $N_X$ sends its highest order result to nodes $N_Y$, and $N_Z$ and gets the corresponding results from nodes $N_Y$, and $N_Z$. These results are compared at 275 and if they match, node $N_X$ proceeds at 252 to select the next test module for processing, and so on.

If it is determined at 260, that node $N_X$ is not behind either node $N_Y$ or node $N_Z$ in test module processing completion, then, at 278, node $N_X$ sends its highest order test module result to nodes $N_Y$ and $N_Z$. At 280, node $N_X$ waits for nodes $N_Y$ and $N_Z$ to process additional modules in order to catch up with node $N_X$. Once nodes $N_Y$ and $N_Z$ have processed modules as high in order as that which node $N_X$ has completed, then at 285, node $N_X$ gets the corresponding test module results from nodes $N_Y$ and $N_Z$. If the results match, as determined at 290, then node $N_X$ continues to 252, where a next test module is selected for processing, and so on. If in any of the testing for matches at 239, 244, 248, 275, or 290, it is determined that one of the nodes' test results does not match the test results' for the other two nodes, then at 250, a malfunction is indicated. Since in the processing illustrated by FIG. 2, three nodes independently process corresponding test modules, mismatches in test results may indicate not only that there has been a hardware failure, but will identify which of the three nodes disagrees with the other two, so that the malfunctioning node may be identified. Therefore, rather than shutting down all three nodes in response to a mismatch in test results, the single, identified malfunctioning node may be shut down, while the other two, presumably non-malfunctioning nodes, continue normal processing.

Following is pseudo-code for the algorithms set forth in FIGS. 1-2. Note, however, that some of the subroutine and variable names differ from those in the FIGS.

PSEUDO-CODE FOR FIG. 1:

```
For Each Node {
  Begin {
    While (1) {
      i = 0
      While (i < n) {
        Signaturei = Run-Suite(Testi);
        Store-Signature (Signaturei);
        Retrieve-Peer-Signature (Signaturej, j, forced_flag);
        If forced_flag == TRUE {
          If i < j {
            Rollforward(Testi, j);
            Send-Peer-Signature (Signaturei, i, forced_flag);
            Match = Match-Signature (Retrieved-Signaturej,
              Stored-Signaturei);
            If Match == TRUE
              i = i + i;
            Else
              Shutdown(Match);
          }
          Else {
            Receive-Peer-Signature (Signaturej, j, forced_flag);
            Match = Match-Signature (Received-Signaturej,
              Stored-Signaturei);
            If Match == TRUE
              i = i + i;
            Else
              Shutdown(Match);
          }
        }
        Else {
          If i < j {
            Match = Match-Signature (Retrieved-Signaturei,
              Stored-Signaturei);
            If Match == TRUE
              i = i + i;
            Else
              Shutdown(Match);
          }
          Else {
            Match = Match-Signature (Retrieved-Signaturej,
              Stored-Signaturej);
            If Match == TRUE
              i = i + i;
            Else
              Shutdown(Match);
          }
        }
      }
    }
  }
}EndWhile
}EndWhile
}End
}
```

PSEUDO-CODE FOR FIG. 2:

```
For Each Node {
  Begin {
    While (1) {
      i = 0;
      While (i < n) {
        Signaturei = Run-Suite(Testi);
        Store-Signature (Signaturei);
        Retrieve-Peer-Signature (Signature(j,k), (j,k), forced_flag);
        If forced_flag == TRUE {
          If i < max (j, k) {
            Rollforward(Testi,max(j,k));
            Send-Peer-Signature (Signaturei, i, forced_flag);
            Match = Match-Signature (Retrieved-Signature(j,k),
```

-continued

PSEUDO-CODE FOR FIG. 2:

```
            Stored-Signaturei);
            If Match == TRUE
              i = i + i;
            Else
              TMR-Recover(Match)
      }
      Else {
        Receive-Peer-Signature (Signature(j,k), (j,k), forced_flag);
        Match = Match-Signature (Received-Signature(j,k),
        Stored-Signaturei);
        If Match == TRUE
          i = i + i;
        Else
          TMR-Recover(Match);
      }
    }
    Else {
      If i < min (j,k) {
        Match = Match-Signature (Retrieved-Signature(i,i),
        Stored-Signaturei);
        If Match == TRUE
          i = i + i;
        Else
          TMR-Recover(Match);
    }
      Else {
        Match = Match-Signature
        (Retrieved-Signature(min(j,k),min(j,k))
        Stored-Signature(min(j,k)));
          If Match == TRUE
            i = i + i;
          Else
            TMR-Recover(Match);
      }
    }
}
}EndWhile
}EndWhile
}End
}
```

Figure 3:
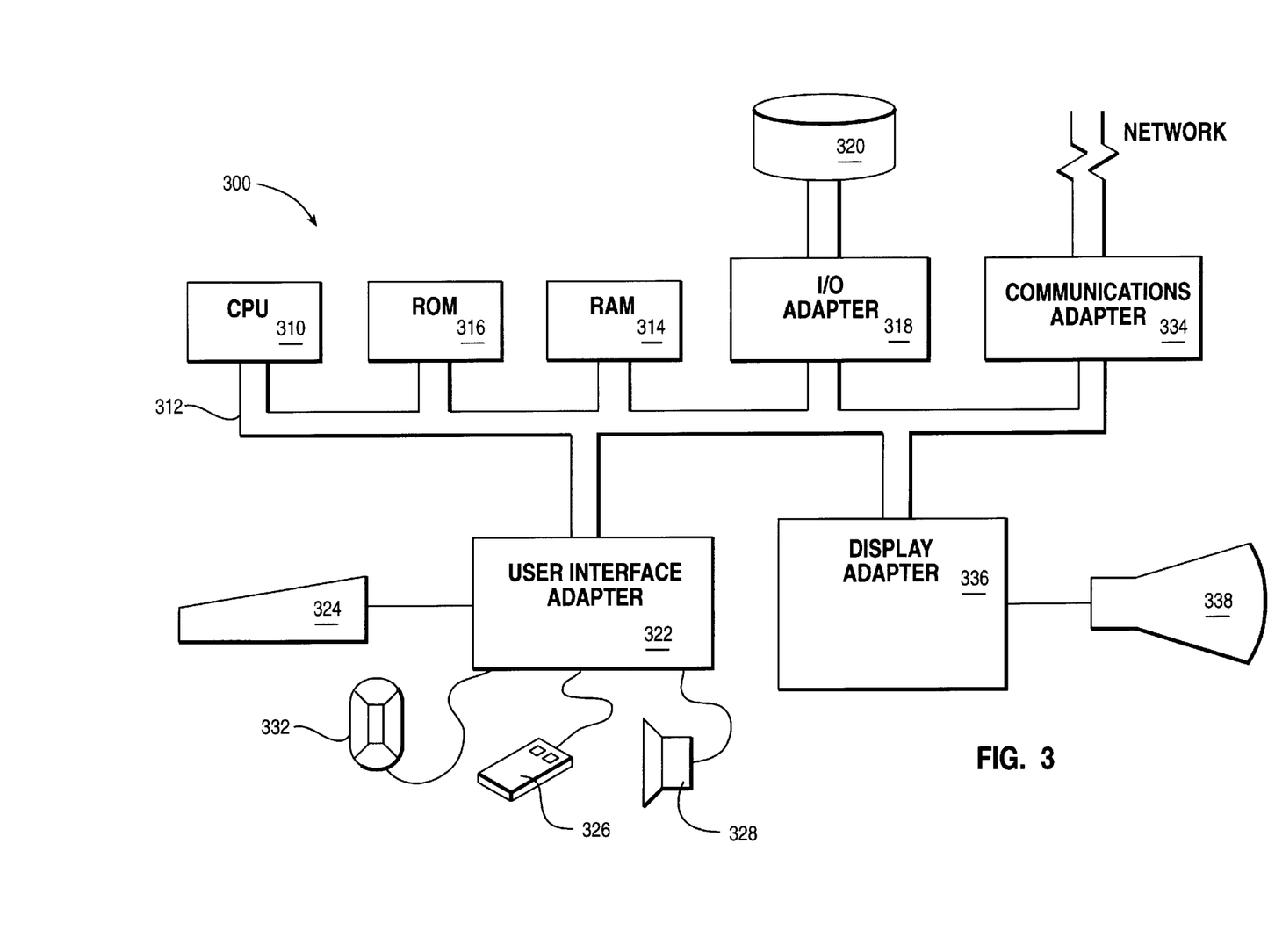
FIG. 3 is a block diagram for a data processing system which may be used in embodiments of the present invention.

Referring to FIG. 3, an example data processing system 300 is shown which may be used for the invention. A central processing unit (CPU) is provided, such as a PowerPC microprocessor ("PowerPC" is a trademark of IBM Corporation) according "The PowerPC Architecture: A Specification for a New Family of RISC Processors", 2nd edition, 1994, Cathy May, et al. Ed., which is incorporated herein by reference. The CPU is coupled to various other components by system bus 312. The history buffer of the present invention is included in CPU 310. Read only memory ("ROM") 316 is coupled to the system bus 312 and includes a basic input/output system ("BIOS") that controls certain basic functions of the data processing system. Random access memory ("RAM") 314, I/O adapter 318, and communications adapter 334 are also coupled to the system bus 312. I/O adapter 318 may be a small computer system interface ("SCSI") adapter that communicates with a disk storage device 320. Communications adapter 334 interconnects bus 312 with an outside network enabling the data processing system to communicate with other such systems. Input/Output devices are also connected to system bus 312 via user interface adapter 322 and display adapter 336. Keyboard 324, track ball 332, mouse 326 and speaker 328 are all interconnected to bus 312 via user interface adapter 322. Display monitor 338 is connected to system bus 312 by display adapter 336. In this manner, a user is capable of inputting to the system through the keyboard 324, trackball 332 or mouse 326 and receiving output from the system via speaker 328 and display 338. Additionally, an operating system such as AIX, DOS or the OS/2 system ("AIX" and "OS/2" are trademarks of the IBM Corporation) is used to coordinate the functions of the various components shown in FIG. 3.

Preferred implementations of the invention include implementations as a computer system programmed to execute the method or methods described herein, and as a computer program product. According to the computer system implementation, sets of instructions for executing the method or methods are resident in the random access memory 314 of one or more computer systems configured generally as described above. Until required by the computer system, the set of instructions may be stored as a computer program product in another computer memory, for example, in disk drive 320 (which may include a removable memory such as an optical disk or floppy disk for eventual use in the disk drive 320). Further, the computer program product can also be stored at another computer and transmitted when desired to the user's work station by a network or by an external network such as the Internet. One skilled in the art would appreciate that the physical storage of the sets of instructions physically changes the medium upon which it is stored so that the medium carries computer readable information. The change may be electrical, magnetic, chemical or some other physical change. While it is convenient to describe the invention in terms of instructions, symbols, characters, or the like, the reader should remember that all of these and similar terms should be associated with the appropriate physical elements.

Note that the invention describes terms such as comparing, validating, selecting or other terms that could be associated with a human operator. However, for at least a number of the operations described herein which form part of the present invention, no action by a human operator is desirable. The operations described are, in large part, machine operations processing electrical signals to generate other electrical signals.

As set forth in the foregoing, the present invention applies aspects of watch-dog timers and fault detection via signatures, but does so in a network computing environment. The invention provides "run time probing", utilizing redundancy inherently present in a network computing environment. That is, in conventional monitoring, run time code is modified to store signatures. For example, the compiler that generates run time code for applications, calculates and embeds signatures in the run time code. In contrast, in the present invention a normal task's run time code is not modified. Instead, test instructions are provided and executed independently of normal tasks.

Also, as set forth in the foregoing, in another aspect of the invention, the test instructions are duplicated and processed in redundant nodes, taking advantage of the inherent redundancy in the network. In contrast, for conventional monitoring, a network redundancy aspect is typically not included, since conventional monitoring was developed in a uniprocessor environment. While some conventional monitoring has been applied in a multiprocessor environment, the present invention has important differences. J. Fabre, Y. Deswarte, J. Laprie, and D. Powell, "Saturation: Reduced Idleness for Improved Fault-Tolerance"; in IEEE Proc. of 18th International Symposium on Fault-Tolerant Computing, June 1988, Tokyo, Japan, 200–205, for example, describes duplicating a task such as searching a database, editing a file, computing a mathematical function, etc., so that the application is run on more than one node and each node's result for the task can be compared to detect malfunctions. This duplication of normal tasks produces broad fault coverage, but is very resource intensive and does not lend itself to heterogeneous environments. In contrast to the technique disclosed by Fabre et al., in the present invention, each node may have an independent workload, ownership, privilege, and even operating system, while merely the test instructions are redundantly processed in common, running in the background. The fault coverage of the present invention may be lower than in duplication of application tasks, monitoring, or hybrid combinations of duplication and monitoring. (Hence the term "probing" is used in connection with the present invention.) However, the run time probing of the present invention does provide substantial fault coverage, while being much less invasive, lower in cost, and applicable across a heterogeneous environment. In particular, the run time probing is especially useful for preventing database corruption.

In another aspect of the invention, run time probing is coupled with application program checkpoints. That is, as conventionally applied, checkpoints may be included in normal tasks, wherein a machine state is stored, such as after a calculation, so that if a malfunction is later detected as having occurred the application can be resumed at the checkpoint by recovering the checkpoint's machine state. The present invention uses synchronization points, which differ from checkpoints. The synchronization points may be solely associated with the test instructions, independent of normal tasks. Unlike a checkpoint, a synchronization point merely stores the signature generated by the test instructions, and does not store the machine state. However, according to this alternative embodiment of the invention wherein checkpoints and synchronization points are coupled, applications store checkpoints in parallel with synchronization points to provide better fault recovery. That is, in response to a node completing a test module, a checkpoint is triggered in a normal, i.e., non-test related, task on the node. In this manner, in response to a fault indication, arising from a comparison between nodes of the signatures associated with the test module, the state of the machine can be recovered at the checkpoint so that the normal task can resume from the checkpoint.

While the invention has been shown and described with reference to particular embodiments thereof, it will be understood by those skilled in the art that the foregoing and other changes in form and detail may be made therein without departing from the spirit and scope of the invention.

What is claimed is:

1. In a network having a number of nodes, a method for identifying node malfunctions, comprising the steps of:
   a) providing corresponding sets of test modules for processing at run time by a number of nodes, wherein there is a test module ordered sequence;
   b) processing the test modules by the nodes, wherein completing the processing of the test modules by the nodes produces corresponding test results for corresponding modules, wherein the processing includes the nodes processing their sets of corresponding test modules asynchronously, and includes each node processing its respective test module set in the test module ordered sequence; and
   c) comparing, for one of the test modules, the corresponding test results from at least two of the nodes;
      wherein, in response to the second node having completed a higher order test module than the first node, the method comprises the step of:
      d) completing one or more test modules by the first node, in addition to any modules completed by the first node at the time the comparing is initiated, until the first node has completed a test module corresponding to the higher order test module completed by the second node; and
      step c) includes comparing the first and second node's test results for the higher order test module;
      and wherein, in response to the first node having completed a higher order test module than the second node, the method comprises the step of:
      e) completing one or more test modules by the second node, in addition to any modules completed by the second node at the time the comparing is initiated, until the second node has completed a test module corresponding to the higher order test module completed by the first node; and
      step c) includes comparing the first and second node's test results for the higher order test module.

2. The method of claim 1, wherein the processing asynchronously includes deferring test module processing by such a node in response to a higher priority task for the respective node.

3. The method of claim 1, wherein steps d) and e) are further in response to a synchronizing event.

4. The method of claim 3, wherein the synchronizing event includes at least one of the following: processing of a database write instruction, I/O instruction, and user-specified interrupt.

5. In a network having a number of nodes, a method for identifying node malfunctions, comprising the steps of;
   a) providing corresponding sets of test modules for processing at run time by a number of nodes, wherein there is a test module ordered sequence;
   b) processing the test modules by the nodes, wherein completing the processing of the test modules by the nodes produces corresponding test results for corresponding modules, wherein the processing includes the nodes processing their sets of corresponding test modules asynchronously, but each node processing its respective test module set in the test module ordered sequence; and
   c) comparing, for one of the test modules, the corresponding test results from at least three of the nodes, a test module most recently completed by a node being referred to as the highest order test module completed by the node, wherein, in response to a first one of the three nodes having completed a highest order test module among the first, second and third nodes, the method comprises the step of:
      d) completing at least one test module by the second or third nodes, in addition to any modules completed by the second and third nodes at the time the comparing is initiated, until the second and third nodes have completed a test module corresponding to the order of test module completed by the first node; and
      step c) includes comparing the three nodes' test results for the highest order test module.

6. The method of claim 5, wherein step d) is further in response to a synchronizing event.

7. The method of claim 6, wherein the synchronizing event includes processing of at least one of the following: a database write instruction, an I/O instruction, and a user-specified interrupt.

8. An apparatus for identifying node malfunctions in a network having a number of nodes, comprising:
   a) means for providing corresponding sets of test modules for processing at run time by a number of nodes, wherein there is a test module ordered sequence;
   b) means for processing the test modules by the nodes, wherein completing the processing of the test modules by the nodes produces corresponding test results for corresponding modules, wherein the processing includes the nodes processing their sets of corresponding test modules asynchronously, and includes each node processing its respective test module set in the test module ordered sequence; and c) means for comparing, for one of the test modules, the corresponding test results from at least two of the nodes;

d) means, responsive to the second node having completed a higher order test module than the first node, for completing one or more test modules by the first node, in addition to any modules completed by the first node at the time the comparing is initiated, until the first node has completed a test module corresponding to the higher order test module completed by the second node, wherein means c) comprises means, responsive to the second node having completed a higher order test module than the first node, for comparing the first and second node's test results for the higher order test module;

and wherein, in response the method comprises the step of:

e) means, responsive to the first node having completed a higher order test module than the second node, for completing one or more test modules by the second node, in addition to any modules completed by the second node at the time the comparing is initiated, until the second node has completed a test module corresponding to the higher order test module completed by the first node, wherein means c) comprises means, responsive to the first node having completed a higher order test module than the second node, for comparing the first and second node's test results for the higher order test module.

9. The apparatus of claim 8, wherein the means for the nodes processing the test modules asynchronously includes means for deferring test module processing by such a node in response to a higher priority task for the respective node.

10. The apparatus of claim 8, wherein completing means d) and e) complete test modules in response to a synchronizing event.

11. The apparatus of claim 10, wherein the synchronizing event includes at least one of the following: processing of a database write instruction, I/O instruction, and user-specified interrupt.

12. An apparatus for identifying node malfunctions in a network having a number of nodes, comprising:

a) means for providing corresponding sets of test modules for processing at run time by a number of nodes, wherein there is a test module ordered sequence;

b) means for processing the test modules by the nodes, wherein completing the processing of the test modules by the nodes produces corresponding test results for corresponding modules, wherein the processing includes the nodes processing their sets of corresponding test modules asynchronously, but each node processing its respective test module set in the test module ordered sequence;

c) means for comparing, for one of the test modules, the corresponding test results from at least three of the nodes, a test module most recently completed by a node, being referred to as the highest order test module completed by the node, d) means, responsive to a first one of the three nodes having completed a highest order test module among the first, second and third nodes, for completing at least one test module by the second or third nodes, in addition to any modules completed by the second and third nodes at the time the comparing is initiated, until the second and third nodes have completed a test module corresponding to a highest order test module completed by the first node; and wherein comparing means c) includes means, responsive to a first one of the three nodes having completed a highest order test module among the first, second and third nodes, for comparing the three nodes' test results for the highest order test module.

13. The apparatus of claim 12, wherein completing means d) completes test modules in response to a synchronizing event.

14. The apparatus of claim 13, wherein the synchronizing event includes processing of at least one of the following: a database write instruction, an I/O instruction, and a user-specified interrupt.

15. A program storage device, readable by a machine, tangibly embodying a program of instructions executable by the machine to perform method steps for identifying node malfunctions in a network having a number of nodes, said method steps comprising:

a) providing corresponding sets of test modules for processing at run time by a number of nodes, wherein there is a test module ordered sequence;

b) processing the test modules by the nodes, wherein completing the processing of the test modules by the nodes produces corresponding test results for corresponding modules, wherein the processing includes the nodes processing their sets of corresponding test modules asynchronously, and includes each node processing its respective test module set in the test module ordered sequence; and c) comparing, for one of the test modules, the corresponding test results from at least two of the nodes;

wherein, in response to the second node having completed a higher order test module than the first node, the method comprises the step of:

d) completing one or more test modules by the first node, in addition to any modules completed by the first node at the time the comparing is initiated, until the first node has completed a test module corresponding to the higher order test module completed by the second node; and step c) includes comparing the first and second node's test results for the higher order test module;

and wherein, in response to the first node having completed a higher order test module than the second node, the method comprises the step of:

e) completing one or more test modules by the second node, in addition to any modules completed by the second node at the time the comparing is initiated, until the second node has completed a test module corresponding to the higher order test module completed by the first node; and step c) includes comparing the first and second node's test results for the higher order test module.

16. The program storage device of claim 15, wherein the processing asynchronously includes deferring test module processing by such a node in response to a higher priority task for the respective node.

17. The program storage device of claim 15, wherein steps d) and e) are further in response to a synchronizing event.

18. The program storage device of claim 17, wherein the synchronizing event includes at least one of the following:

processing of a database write instruction, I/O instruction, and user-specified interrupt.

19. A program storage device, readable by a machine, tangibly embodying a program of instructions executable by the machine to perform method steps for identifying node malfunctions in a network having a number of nodes, said method steps comprising:

a) providing corresponding sets of test modules for processing at run time by a number of nodes, wherein there b) processing the test modules by the nodes, wherein completing the processing of the test modules by the nodes produces corresponding test results for corresponding modules, wherein the processing includes the nodes processing their sets of corresponding test modules is a test module ordered sequence; asynchronously, but each node processing its respective test module set in the test module ordered sequence; and c) comparing, for one of the test modules, the corresponding test results from at least three of the nodes, a test module most recently completed by a node being referred to as the highest order test module completed by the node, wherein, in response to a first one of the three nodes having completed a highest order test module among the first, second and third nodes, said method steps comprise the step of:

d) completing at least one test module by the second or third nodes, in addition to any modules completed by the second and third nodes at the time the comparing is initiated, until the second and third nodes have completed a test module corresponding to the order of test module completed by the first node; and step c) includes comparing the three nodes' test results for the highest order test module.

20. The program storage device of claim 19, wherein step d) is further in response to a synchronizing event.

21. The program storage device of claim 20, wherein the synchronizing event includes processing of at least one of the following: a database write instruction, an I/O instruction, and a user-specified interrupt.

* * * * *